United States Patent [19]

Bentley

[11] 4,075,677

[45] Feb. 21, 1978

[54] ELECTROSTATIC COATING SYSTEM

[75] Inventor: Stanley L. Bentley, Indianapolis, Ind.

[73] Assignee: Ransburg Corporation, Indianapolis, Ind.

[21] Appl. No.: 712,781

[22] Filed: Aug. 9, 1976

[51] Int. Cl.[2] .............................................. H02H 3/08

[52] U.S. Cl. ........................................ 361/93; 361/57; 361/235; 363/53

[58] Field of Search ........................ 361/54, 57, 93, 97, 361/100, 235; 363/50, 52, 53, 54, 55, 56, 57, 58

[56] References Cited

U.S. PATENT DOCUMENTS

| | | | |
|---|---|---|---|
| 2,742,104 | 4/1956 | Hall | 361/235 X |
| 3,443,358 | 5/1969 | Drenning et al. | 361/235 X |
| 3,725,738 | 4/1973 | Sokolsky et al. | 361/235 |
| 3,764,883 | 10/1973 | Staad et al. | 363/53 |
| 3,795,839 | 3/1974 | Walberg | 361/235 X |
| 3,805,142 | 4/1974 | Rando | 363/53 |
| 3,824,441 | 7/1974 | Heyman et al. | 363/50 X |
| 3,893,006 | 7/1975 | Algeri et al. | 363/56 X |

*Primary Examiner*—William M. Shoop
*Attorney, Agent, or Firm*—Merrill N. Johnson

[57] ABSTRACT

A system for electrostatic deposition of a coating on an article from a charging device includes a direct current high voltage supply having first and second terminals across which the high voltage is impressed. The article to be coated is held at a potential substantially equal to the potential on one of the high voltage terminals. The article is suspended for relatively free movement toward and away from the device. The system includes a high-speed switch coupled between the high voltage terminals and a control circuit for controlling the switch. A sensing resistor in the high voltage output circuit monitors the current between the high voltage terminals. The control circuit includes a slope-detecting or fixed difference circuit responsive to the sensed current to detect too-rapid changes therein, such changes being indicative of close proximity of the article to the charging device and the possibility of high voltage arcing therebetween. The fixed difference circuit compares a sampled signal, related to the sensed current by a fixed difference, with a signal related to the instantaneous value of the sensed current to predict a condition conducive to high voltage arcing. The control circuit additionally includes an automatic ranging circuit for comparing a sampled signal related to the actual current through the sensing resistor with a signal related to a predetermined multiple of the instantaneous current through the sensing resistor. The automatic ranging circuit therefore is not concerned with the absolute magnitude of the current through the sensing resistor, as is the slope-detecting circuit, but rather, the automatic ranging circuit considers only the difference between a sampled signal related to current through the sensing resistor and a signal related to the instantaneous value of current through the sensing resistor.

The high voltage supply further includes a high voltage transformer having primary and secondary windings. The primary winding includes a supply terminal coupled to a relatively low voltage supply and two terminals coupled to a switching circuit which controls current flow through the primary winding. The resulting voltage variations across the secondary winding are rectified and multiplied to produce the high voltage. A resistive voltage divider senses the high voltage. A regulator coupled between the low voltage supply and the supply terminal regulates the voltage provided to the supply terminal, thereby regulating the high voltage.

30 Claims, 6 Drawing Figures

ELECTROSTATIC COATING SYSTEM

This invention relates to a control circuit and more particularly to a control circuit for an electrostatic coating apparatus for preventing disruptive electrical discharge. Typically, articles to be coated by an electrostatic coating apparatus will be conveyed past the coating apparatus on a conveyor. Such articles are subject to motion not only past the apparatus but also oscillatory motion, e.g., swinging motion toward and away from the high voltage electrode of the coating apparatus.

In industrial electrostatic coating systems, high voltage direct current power supplies are used which produce across a pair of terminals, potentials having high magnitudes, for example, 140 kilovolts (KV) DC. Typically, one of the terminals is at ground or approximately ground potential while the other terminal is held at a high-magnitude (frequently negative) potential. This last, or high potential, terminal is connected to a charging device which charges particles of the coating material. The atomized and charged material moves through the electric field between the charging device and the article in the direction of the article, strikes the article, and sticks to it. Generally, the article is maintained at a low potential, e.g., approximately ground, just as is the low potential terminal of the high voltage supply.

In a typical automatic electrostatic coating installation, articles to be coated are frequently carried on a conveyor and are thus free to swing back and forth in the direction of the charging device. As an article to be coated moves toward the charging device, the potential gradient between the charging device, which is at a high-magnitude potential, and the article, which is typically at approximately ground potential can increase quite rapidly. The rapidity of the increase depends in part upon how rapidly the article is swinging. The maximum and minimum values of the potential gradient depend upon the amplitude of the swing of the article. The current between the charging device and the article which results in part from the flow of charged particles of coating material across the space therebetween varies as the potential gradient between the article and the charging device varies, the current increasing as the spacing between the article and charging device decreases toward a minimum, and decreasing as the spacing between the article and the charging device increases to a maximum. Appreciation of these characteristics of such coating apparatus has been amply demonstrated by U.S. Pat. Nos. 3,851,618; 3,875,892; and 3,894,272.

As can be appreciated, a considerable hazard presented by movement of articles to be coated with respect to the charging device is the possibility of spark discharge across the space between the charging device and the freely moving articles. The desirability of a system which prevents such spark discharge is apparent. Operators of electrostatic coating apparatus occasionally occupy work stations quite close to the charging device, the articles being coated, or both. Additionally, certain materials used in the coating process, or in operations related to the coating process, are volatile. Thus, the vapors of such materials may be present in the atmosphere near the coating apparatus. Many such materials are flammable. Further, fine particles of the coating material itself are frequently suspended in the atmosphere surrounding the coating apparatus.

The safety hazards presented by the possibility of a high voltage spark between the charging device and the article to be coated evinces the desirability of a system which can predict with reasonable accuracy conditions conducive to arcing and act to prevent such arcing. Additionally, of course, such high voltage arcing can be detrimental to parts of the electrostatic coating apparatus itself, e.g., the high voltage supply.

As the aforementioned patents discuss, it is extremely useful to be able to predict the conditions which favor high voltage arcing. The apparatus disclosed in those patents acts on such a prediction to reduce the potential on the charging device to a low level to prevent arcing. The prior art systems predict the existence of conditions conducive to high voltage arcing by dividing a length of system operating time into first and second sampling intervals. During the first sampling interval, the value of a high voltage supply operating parameter, e.g., output current between terminals of the high voltage supply, is monitored and a peak value for this parameter is established. This peak value is held during the second sampling interval. During the second sampling interval, the same system parameter is continuously compared to the stored value to develop a difference signal.

If the magnitude of the difference signal is greater than a predetermined maximum, a change in the system parameter greater than that typically associated with normal system operation is indicated. This excessive change in the system parameter portends high voltage arcing. A signal produced by the system whenever such an excessive change is detected triggers a device which is coupled to the high voltage supply. The device quite rapidly reduces the potential across the high voltage supply output terminals to a nominal value or zero volts. Such a sample-hold and compare feature is generally referred to as "slope-detection".

Articles of disparate sizes and shapes frequently activate slope-detecting and peak output current, or static overload, safety features because of the large differences in coating current drawn by articles with smaller surface areas as compared to articles with larger surface areas. For this reason, operators often try to override slope-detecting and static overload features.

The present system constitutes an improvement over such prior art devices. The present system includes an automatic ranging feature which better protects against high voltage arcing when the system operator attempts to override the slopedetecting protection features and/or the static overload current features with which many prior art systems are provided.

It is an object of the present invention to provide an improved control system for predicting close proximity of an article to be coated to a charging device and for reducing to a nominal value the potential supplied to the charging device in response to such prediction.

According to the present invention, a system for controlling the voltage across a pair of terminals includes a voltage generating supply coupled to the terminals. Means are provided for sensing the output current between the terminals. Means are coupled across the terminals for disrupting the voltage impressed across them. The disrupting means include at least one control electrode. The system further includes a control circuit and first circuit means for coupling the control circuit to the sensing means to provide at an input terminal of the control circuit an output current-related signal. The control circuit includes second circuit means for generating a first input signal related to the output current-related signal by a predetermined selectively variable fixed difference. The control circuit further includes sample-and-hold circuit means for sampling the first input signal during successive sampling intervals and for storing the first input signal between such intervals. A first comparator in the control circuit compares the sampled value of the first input signal to the actual value of the current-related signal and generates a first output signal when the actual value exceeds the sampled value. Means are provided for coupling the first comparator to the control electrode, the first output signal controlling the disrupting means. The control circuit further includes third circuit means for generating a second input signal related to the first input signal by a predetermined, selectively variable multiplier. A second comparator in the control circuit compares the sampled value of the first input signal to the actual value of the second signal. The second comparator generates a second output signal when the actual value of the second input signal exceeds the sampled value of the first input signal. Means are provided for coupling the second comparator to the control electrode, the second output signal also controlling the disrupting means.

Further, according to the present invention, an automatic system for electrostatic deposition of a coating includes means for sensing the voltage impressed across the high voltage terminals. A high voltage transformer includes a primary winding and a secondary winding, the primary winding including at least one terminal for supplying relatively lower voltage to the primary winding and at least one terminal for controlling current flow through the primary winding from the lower voltage supply terminal. Means for switching current flow through the primary winding are coupled to the control terminal. A switching waveform generator controls the switching means. Means are provided for rectifying voltage variations induced across the secondary winding in response to switched current flow in the primary winding. The rectifying means are coupled to the secondary winding and to the first and second high voltage terminals. Means are provided for supplying the relatively lower voltage. Means for regulating the supply of relatively lower voltage to the primary winding are serially coupled between the relatively lower voltage supply and the supply terminal of the primary winding. The regulating means are coupled to the sensing means, the regulating means being controlled by high voltage representative signals received from the sensing means to control the voltage at the supply terminal of the primary winding, thereby controlling the high voltage.

The invention may best be understood by referring to the following description of an embodiment of the invention and the accompanying drawings which illustrate the invention. In the drawings.

Figure 1:
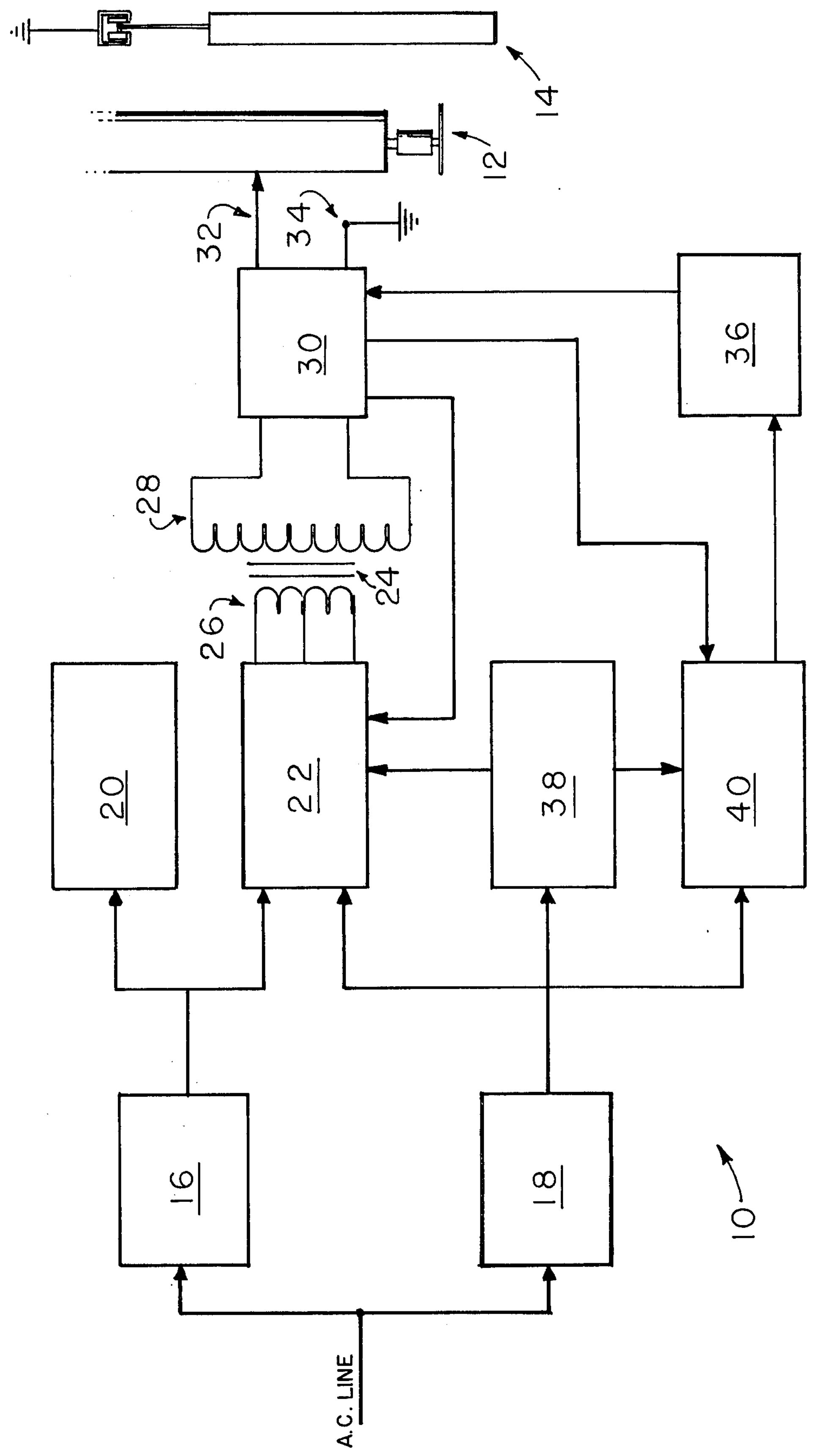
FIG. 1 is a partly block and partly schematic diagram of an automatic system for electrostatic high voltage deposition of coatings.
Figure 4A:
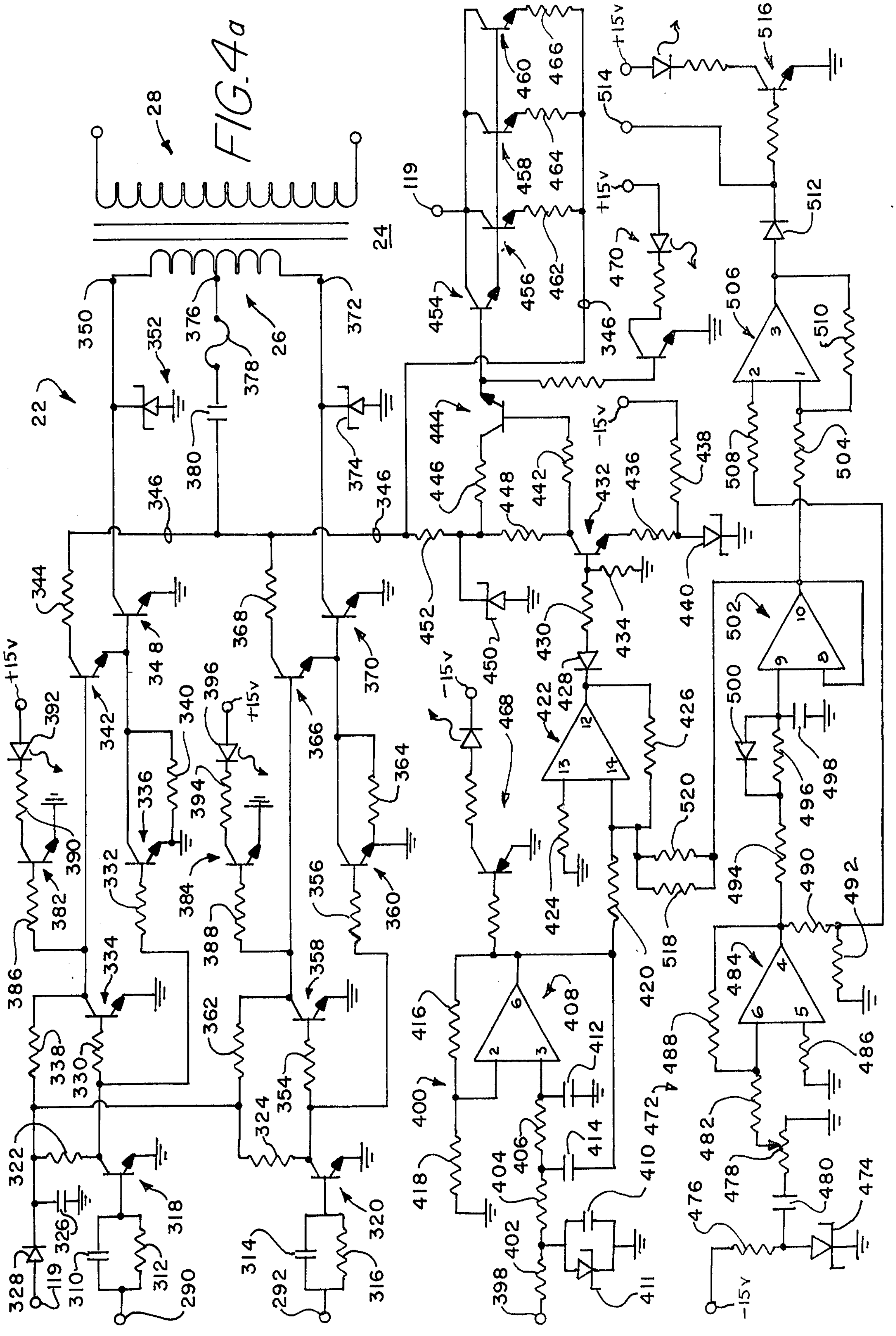
Figure 4B:
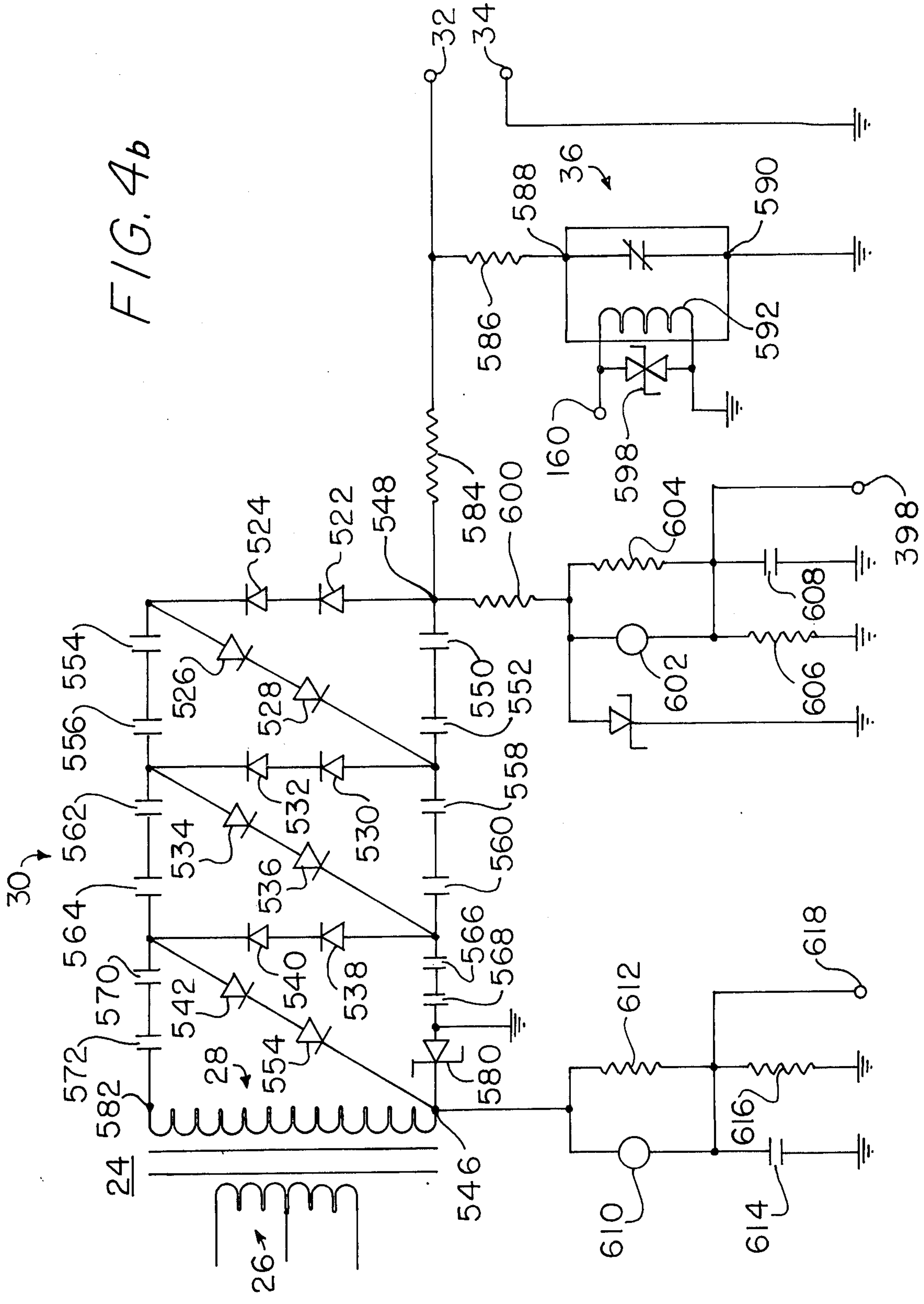
Figure 5:
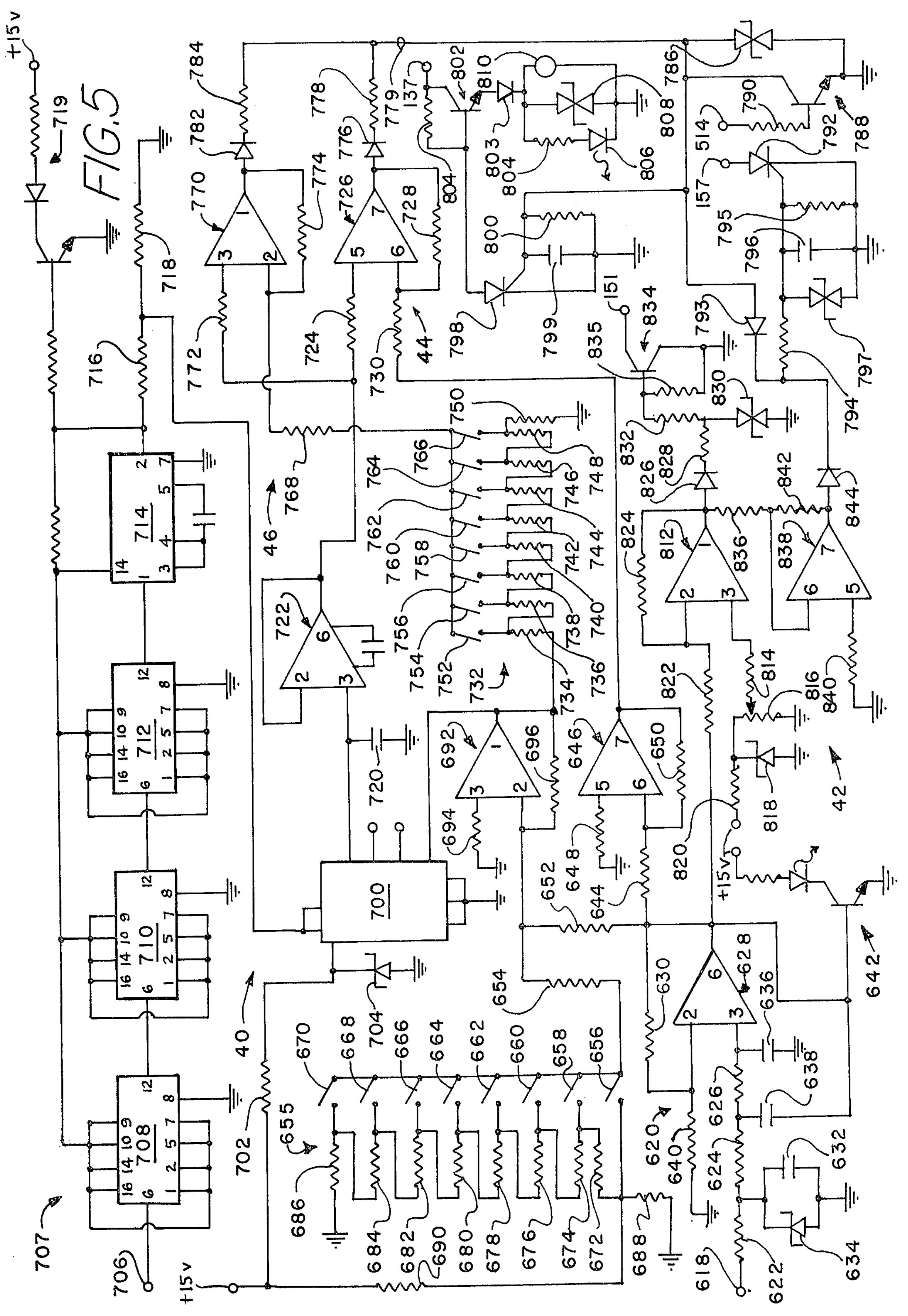

FIGS. 4*a*-*b* are schematic diagrams of two details of the system of FIG. 1; and FIG. 5 is a partly block and partly schematic diagram of several details of the system of FIG. 1.

Referring to FIG. 1, an automatic system 10 for electrostatic high voltage deposition of a coating from an atomizing and charging head 12 upon an article 14, which is typically moving past atomizing and charging head 12 on a conveyor, is illustrated in block diagram form.

The system 10 includes a main power supply 16 for producing direct current at an intermediate voltage, e.g., 28 volts. In addition, an auxiliary power supply 18 is provided to produce a direct current at one or more relatively low voltages, e.g., plus or minus 15 volts. Power supplies 16, 18 in the illustrated embodiment provide all of the power consumed by system 10.

System 10 further includes a control and indicator panel 20 from which the operating status of the system is continuously displayed. To produce the large magnitude voltage necessary for electrostatic deposition, e.g., negative 140 kilovolts (KV), a switching and regulating circuit 22 and a high voltage transformer 24 are provided. High voltage transformer 24 includes a primary winding 26 and a secondary winding 28.

A high voltage rectifier and multiplier 30 is coupled to the secondary winding 28 of transformer 24. Article 14 is maintained at or near the potential of one of a pair of high voltage output terminals 32, 34. High voltage rectifier and multiplier 30 produces across terminals 32, 34 sufficient potential so that atomized particles of coating material, e.g., paint, will be attracted toward and deposited upon article 14.

A clock circuit 38 drives switching and regulating circuit 22 to switch the main power supply 16 voltage across primary winding 26 and produce high voltage in secondary winding 28.

Article 14 is typically conveyed past atomizing and charging head 12 on a conveyor. Thus, article 14 is movable with respect to atomizing and charging head 12 and it is desirable to control the potential across output terminals 32, 34 such that if article 14 comes too close to head 12, the potential across terminals 32, 34 will be reduced quickly to a negligible value. This is done primarily for safety reasons, e.g., to prevent operators of system 10 from being exposed to high voltage arcing, and to prevent such arcing from igniting flammable materials which may be suspended in the air in the vicinity of atomizing and charging head 12. Further, of course, such arcing can be detrimental to system 10 itself. To avoid such hazardous conditions, a high voltage, high current shorting device 36 is included in system 10. Shorting device 36 is coupled to circuit 30 and is capable of reducing the potential across terminals 32, 34 thereof to a negligible value extremely quickly.

To control shorting device 36, a predictive control circuit 40 is coupled to circuit 30 and shorting device 36. Circuit 40 monitors conditions in the high voltage circuit 30 and protects it against such undesirable conditions as overloading and shorting by producing, in response to such monitored conditions, control signals for shorting device 36. Shorting device 36 responds to such control signals, as previously suggested, to reduce to some nominal voltage or zero volts the potential across output terminals 32, 34.

Predictive control circuit 40 includes a static overload protection circuit 42, which is set to an absolute maximum allowable current between terminals 32, 34. Sensing by static overload circuit 42 of current in excess of this allowable maximum causes shorting device 36 to operate. Circuit 40 further includes a "fixed difference" or "slope-detecting" circuit 44 incorporating a sample-and-hold function. Slopedetecting circuit 44 samples, at a relatively slow rate, e.g., 5 Hertz, a sensed condition, e.g., current flow between terminals 32, 34 of circuit 30 and continuously compares that sampled-and-held condition during each "hold" interval with the actual value of that sensed condition. If the actual current exceeds the stored value by a predetermined, adjustable fixed difference, slope-detecting circuit 44 produces a signal which causes shorting device 36 to operate, reducing the potential across terminals 32, 34.

Predictive control circuit 40 further includes an automatic ranging circuit 46. When articles 14 of varying sizes and shapes are passed by head 12 in varying orientations, the peak instantaneous current between terminals 32, 34 can vary considerably. To avoid continuous interruption of his work, the operator may set static overload circuit 42 such that circuit 42 will not trip device 36. He may also manually adjust the fixed difference circuit such that it will allow substantial difference current to flow between terminals 32, 34 to avoid being inconvenienced by the continuous interruption of his work resulting from tripping of the shorting device by the fixed difference circuit. To protect against the dangers inherent in this situation, the automatic ranging circuit 46 also monitors an operating parameter of high voltage circuit 30. Typically, and in the illustrated embodiment, that operating parameter is related to current between terminals 32, 34.

The automatic ranging circuit 46, like fixed difference circuit 44, continuously monitors such operating conditions. Additionally, and like fixed difference circuit 44, automatic ranging circuit 46 compares the sampled-and-held value of the monitored high voltage circuit 30 condition with a preselected multiple of the actual condition. This preselected multiple is set in advance of operation of system 10 and takes into account differences in shape, size and orientation of articles 14. In the illustrated embodiment, this preselected multiple is discretely variable. However, it is understood that this preselected mulitple could be continuously variable. Automatic ranging circuit 46 thus overcomes the dangers which otherwise would exist if the operator resets the static overload protection circuit 42 to a very high value and either resets or disconnects the fixed difference detector 44 when coating very large parts. Automatic ranging circuit 46 allows considerable deviation of the output current between terminals 32, 34 while maintaining the ability to determine when an overload or shorted condition is likely to occur across terminals 32, 34.

Figure 2:
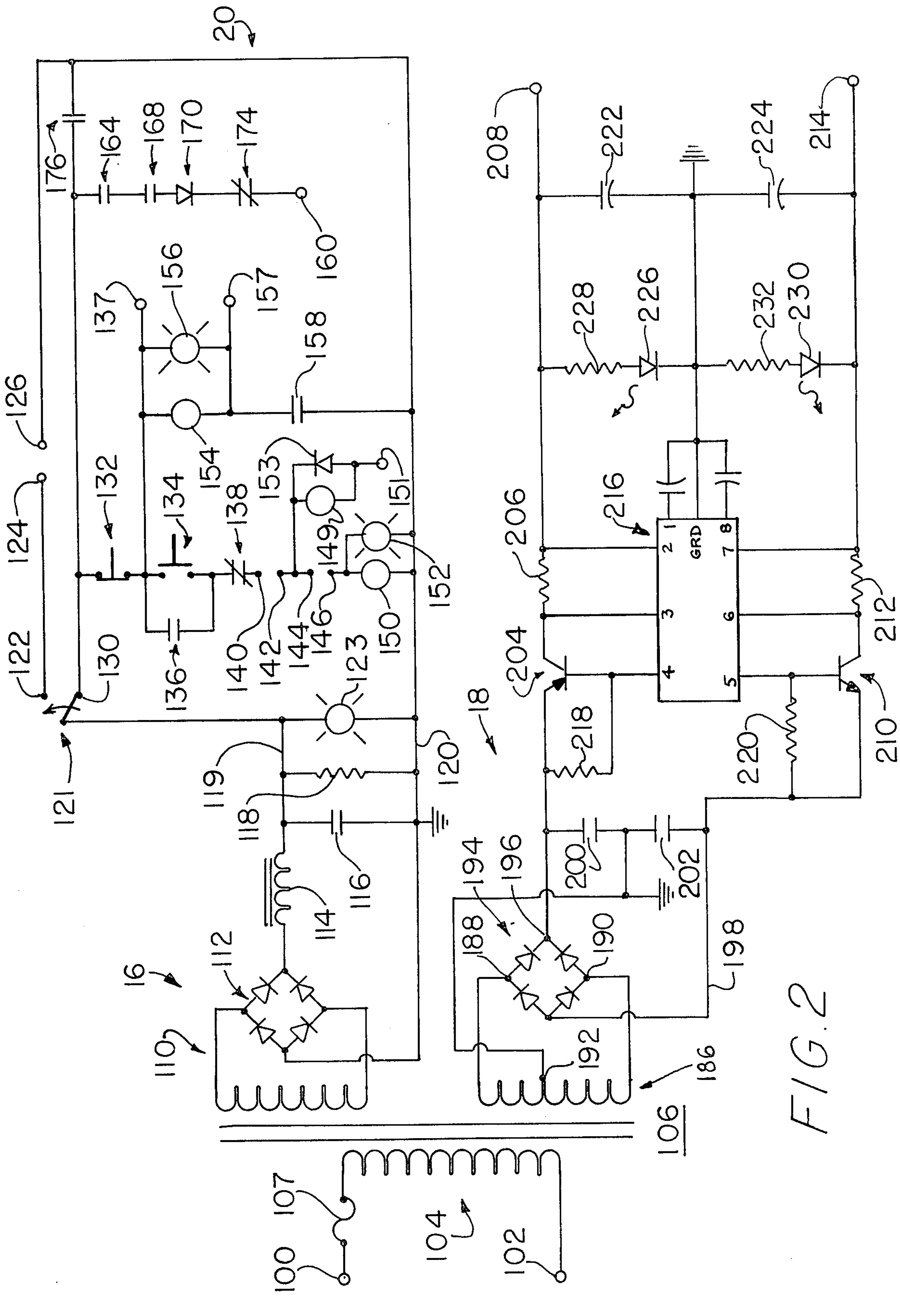
FIG. 2 is a partly block and partly schematic diagram of a detail of the system of FIG. 1.

Referring now to FIG. 2, terminals 100, 102 of system 10 are coupled to a suitable power source, e.g., 220-volt, single-phase 50–60 Hz alternating current line. A primary winding 104 of a main power transformer 106 and fuse 107 are serially coupled between terminals 100, 102. Transformer 106 includes a secondary 110, across the terminals of which a conventional full-wave bridge rectifier 112 is coupled. The output circuit of bridge rectifier 112 includes a series inductive filter 114 and a parallel combination of a storage capacitor 116 and a resistor 118. The aforementioned intermediate direct current voltage is developed across two terminals 119, 120 at opposite sides of the parallel combination 116, 118. Terminal 120 is the system ground and will hereinafter be referred to as ground.

Referring to the panel 20 portion of FIG. 2, a single-pole double-throw, high voltage bypass switch 121 is coupled to terminal 119. A panel power indicator lamp 123 is also coupled across terminals 119, 120 to indicate when main power is on. In series with one of the poles 122 of switch 121 are a pair of terminals 124, 126. Terminal 126 is coupled to ground. This circuit is provided so that the user of system 10 can couple between terminals 124, 126 one or more items of directcurrent operated equipment which must be run at times without the high voltage circuitry. For example, a direct-current paint pump can be coupled between terminals 124, 126. Such a pump is frequently included in this circuit so that the pump (not shown) can be run to circulate cleaning fluids through the paint system when no high voltage is present.

Coupled to a pole 130 of switch 121 is a press-to-open high voltage "off" switch 132. In series with switch 132 is the parallel combination of a press-to-close high voltage "on" switch 134 and a pair of normally open relay contacts 136. A terminal 137 is formed at the junction of switches 132, 134. In series with the parallel combination of switch 134 and relay contacts 136 is a pair of normally closed relay contacts 138 and two series pairs of terminals 140, 142 and 144, 146 for items of user equipment, e.g., a coating booth fan (not shown) and a conveyor motor (not shown). Such items are frequently used in connection with the illustrated system 10. Between terminal 146 and ground is a parallel combination of a relay actuating solenoid 150 and a high voltage "on" lamp 152. A relay actuating solenoid 149 is coupled between terminal 142 and a terminal 151. A flyback diode 153 is coupled in the reverse direction across solenoid 149.

Between the junction of switches 132, 134 and a terminal 157 there is coupled a parallel combination of a relay actuating solenoid 154 and an overload indicator lamp 156. Between terminal 157 and ground is a pair of normally open relay contacts 158.

Also serially coupled between pole 130 and a terminal 160 are a pair of normally open relay contacts 164, a pair of normally open relay contacts 168, a protective diode 170, and a pair of normally closed relay contacts 174. A transient suppressing capacitor 176 is coupled between pole 130 and ground.

Main power transformer 106 further includes a tertiary winding 186 having end terminals 188, 190 and a center tap terminal 192. Winding 186 supplies power through terminals 188-192 to auxiliary power supply 18.

Auxiliary power supply 18 includes a full-wave bridge rectifier 194. Across the output terminals 196, 198 of bridge rectifier 194 are two series filter capacitors 200, 202. Terminal 192 is coupled to the junction of capacitors 200, 202 and ground. Terminal 196 is coupled to the emitter of a series regulating PNP transistor 204. The collector of transitor 204 is serially coupled through a control voltage resistor 206 to a terminal 208. Terminal 198 is coupled to the emitter of a NPN series regulating transistor 210. The collector of transistor 210 is serially coupled through a control voltage resistor 212 to a terminal 214. The voltages sensed across resistors 206, 212 are supplied to terminals of an integrated circuit 216 which generates, in response to the voltages across resistors 206, 212, regulating voltages which are coupled to the bases of transistors 204, 210, respectively.

The small numbers within the block denoting integrating circuit 216 represent the pin designations of a particular integrated circuit used in the construction of this embodiment. Such pin numbers will be included in all of the figures for the convenience of the reader.

Bias resistors 218, 220 are coupled between terminals 196, 198, respectively, and the bases of transistors 204, 210, respectively. Two series storage capacitors 222, 224 are coupled between terminals 208, 214. The junction of capacitors 222, 224 is grounded. A series combination of a light emitting diode (LED) 226 and a resistor 228 is coupled between terminal 208 and ground, and a similar combination of an LED 230 and a resistor 232 is coupled between ground and terminal 214. Auxiliary supply 18 produces at terminal 208 a low direct-current positive potential, e.g., plus 15 VDC, and at terminal 214 a low-magnitude direct-current negative potential, e.g., minus 15 VDC. Diodes 226, 230, respectively, indicate when the plus and minus voltage supplies are functioning.

Since direct current is switched in system 10 to produce the high voltage through a step-up transformer 24, one or more switching wave forms must be generated within system 10. To this end, system 10 includes a clock circuit 38 illustrated in FIG. 3. Circuit 38 includes a unijunction transistor (UJT) 240, one base of which is coupled through a load resistor 242 to ground and the other base of which is coupled through a biasing resistor 244 to minus 15 volts. The emitter circuit of UJT 240 includes the series combination of a capacitor 246, a resistor 248 and a frequency adjusting potentiometer 250, between ground and minus 15 volts. The output signal from this UJT oscillator is coupled through a capacitor 252 through a parallel capacitor 254 and resistor 256 to the base of an NPN transistor 258. The base bias resistors 260, 262 of transistor 258 are coupled between plus and minus 15 volts. The collector of transistor 258 is coupled through a resistor 264 to plus 15 volts. The emitter of transistor 258 is coupled through a resistor 266 to minus 15 volts. Transistor 258 and its associated components comprise a buffer stage between the UJT oscillator and the next succeeding stage.

The emitter of transistor 258 is coupled through a capacitor 268 and a parallel capacitor 270 and resistor 272 to the base of the transistor 274. The base of transistor 274 is biased through a resistor 276 to plus 15 volts. The collector of transistor 274 is coupled through resistor 278 to plus 15 volts, and its emitter is coupled through a resistor 280 to ground.

Transistor 274 generates a positive-going pulse at its collector, which pulse is shaped in an integrated circuit monostable multivibrator 282. The output signal on pin 2 of multivibrator 282 is coupled to the input pin 7 of a divide-by-ten counter 284. The output signal on pin 12 of counter 284 is coupled to an input pin 12 of an J-K flip-flop 286. The dual output terminals, pins 10 and 14, of flip-flop 286 are coupled to the input terminals, pins 7 and 15, of a wave-shaping inverter integrated circuit 288. UJT oscillator 240 operates at approximately 50 kilohertz (KHz) such that at the output terminals 290, 292 of clock circuit 38 there are produced two positive-going oppositely phased rectangular pulses with frequencies of 5 KHz.

Two transistors 294, 296 with their bases coupled through resistors 298, 300, respectively, to the input terminal, pin 7, and output terminal, pin 12, of counter 284 monitor the operation of clock circuit 38. The emitters of transistors 294, 296 are grounded, and their collectors are coupled through series resistors 302, 304, respectively, and LEDs 306, 308, respectively, to the plus 15-volt supply to provide visual indications of clock circuit 38 operation.

Referring now to FIG. 4*a*, the high voltage primary winding 26 switching and regulating circuit 22 will be explained. Clock 38 output terminals 290, 292 are coupled through parallel capacitor 310 and resistor 312, and parallel capacitor 314 and resistor 316, respectively, to the bases of two predriver transistors 318, 320, respectively. The emitters of transistors 318, 320 are coupled to ground, and their collectors are coupled through load resistors 322, 324, respectively, to a power supply capacitor 326. Capacitor 326 is coupled between terminal 119 of main power supply 16, through a diode 328, and ground.

The collector of transistor 318 is coupled through two base resistors 330, 332, to two driving transistors 334, 336, respectively. The collector of transistor 334 is coupled through a load resistor 338 to supply capacitor 326. The collector of transistor 336 is coupled through a resistor 340 to ground. The emitters of transistors 334, 336 are both grounded. The collector of driver transistor 334 is coupled to the base of a driver transistor 342. The collector of driver transistor 342 is coupled through a load resistor 344 to a regulating voltage supply bus 346. The emitter of transistor 342 is coupled to the collector of transistor 336 and to the base of an output transistor 348. The emitter of transistor 348 is grounded. The collector of transistor 348 is coupled to a terminal 350 of the high voltage transformer 24 primary winding 26. The collector of transistor 348 is also coupled to the cathode of a transient-suppressing Zener diode 352. The anode of Zener diode 352 is coupled to ground.

The collector of predriver transistor 320 is coupled through two base resistors 354, 356 to two driver transistors 358, 360, respectively. The collector of transistor 358 is coupled through a load resistor 362 to voltage supply capacitor 326. The collector of transistor 360 is coupled through a resistor 364 to ground. The emitters of transistors 358, 360 are both grounded. The collector of transistor 358 is also coupled to the base of a driver transistor 366. The collector of driver transistor 366 is coupled through a load resistor 368 to the regulating voltage supply bus 346. The collector of transistor 360 is coupled to the emitter of transistor 366 and to the base of an output transistor 370. The collector of output transistor 370 is coupled to a terminal 372 of the high voltage transformer 24 primary winding 26. The collector of transistor 370 is also coupled to the cathode of a transientsuppressing Zener diode 374, the anode of which is coupled to ground.

The several transistor stages between terminal 290 of clock 38 and terminal 350 of high voltage primary winding 26 amplify the signal on terminal 290 such that when the clock signal is positive going, output transistor 348 is driven to saturation, placing terminal 350 at approximately ground potential. When the signal on terminal 290 is negative going, output transistor 348 is driven to cut-off, removing the ground potential from terminal 350. The several transistor stages between clock terminal 292 and the terminal 372 of the high voltage primary winding 26 are driven in response to the oppositely phased clock signal at terminal 292. When the signal on terminal 292 is positive going (corresponding to negativegoing signal on terminal 290), output transistor 370 is driven into saturation, placing terminal 372 at approximately ground. When the signal on terminal 292 is negative going (corresponding to positive-going signal on terminal 290), output transistor 370 is driven into cut-off, removing the approximately ground potential from terminal 372.

Current is supplied to high voltage primary winding 26 through a center tap terminal 376. Terminal 376 is coupled to the regulating voltage supply bus 346 through a protecting fuse 378 and a pair of normally open relay contacts 380.

The bases of two transistors 382, 384, respectively, are coupled through base resistors 386, 388, respectively, to the collectors of driver transistors 334, 358, respectively. The emitters of transistors 382, 384 are grounded and their collectors are coupled through series resistor 390 and LED 392 and series resistor 394 and LED 396, respectively, to plus 15 volts. LEDs 392, 396 provide visual indications of the operation of their respective driver transistors 334, 358.

Linearly regulated direct current voltage is supplied to bus 346 in a manner which will now be explained. A terminal 398 of the regulator circuit of FIG. 4*a* continuously monitors the signal produced in the high voltage circuit of FIG. 4*b*. The manner in which this signal is produced will be discussed in connection with FIG. 4*b*. For purposes of the present discussion of the function of the regulator, however, it will suffice to understand that the signal on terminal 398 is directly proportional to the output high voltage between terminals 32, 34 of FIG. 1. Therefore, the signal on terminal 398 contains a substantial DC component corresponding to the quite high DC component of the voltage across terminals 32, 34, e.g., 140 KV DC. However, the voltage across terminals 32, 34 and thus the signal on terminal 398 also includes a considerable amount of AC "ripple" or "noise" from several sources. For example, much of the noise can be traced to the 5 KHz switching in the high voltage primary 26 which is coupled to the high voltage secondary winding 28 and switching in the high voltage rectifier and multiplier 30 (FIGS. 1, 4*b*) wherein the voltage variations induced across secondary winding 28 are rectified and multiplied. In order to obtain a substantially noise-free signal related to the direct-current voltage only across terminals 32, 34, it is necessary to filter all possible AC components from the signal on terminal 398.

Since much of this AC noise occurs at the 5 KHz switching rate, or at multiples thereof, a filter which rolls off at a frequency considerably lower than 5 KHz is used in the disclosed embodiment. The disclosed filter 400 is a three-pole, active filter of the type commonly known as a butterworth filter. Filter 400 rolls off at 100 Hz. Terminal 398, the input terminal of filter 400, is coupled through three series resistors 402, 404, 406 to the noninverting input terminal, pin 3, of an integrated circuit operational amplifier 408. Hereinafter such devices shall be referred to simply as "amplifiers", with the understanding that integrated circuits are widely used in the illustrated embodiment.

The junction of resistors 402, 404 is coupled through a parallel combination of a capacitor 410 and a Zener diode 411 to ground. Pin 3 of amplifier 408 is coupled to ground through a capacitor 412. The output terminal, pin 6, of amplifier 408 is returned to the junction of resistors 404, 406 through a capacitor 414. Pin 6 is also coupled through a feedback resistor 416 to the inverting input terminal, pin 2, of amplifier 408. Pin 2 is coupled to ground through a resistor 418.

The output signal on pin 6 of amplifier 408 is coupled through a resistor 420 to the inverting input terminal, pin 14, of an amplifier 422. The noninverting terminal, pin 13, of amplifier 422 is coupled through a resistor 424 to ground. A feedback resistor 426 is coupled between the output terminal, pin 12, of amplifier 422 and pin 14 thereof.

Pin 12 of amplifier 422 is also coupled to the cathode of a diode 428, the anode of which is coupled through a series resistor 430 to the base of a driver transistor 432. The base of transistor 432 is coupled through a resistor 434 to ground. The emitter of transistor 432 is coupled through a pair of series resistors 436, 438 to minus 15 volts supply. The junction of resistors 436, 438 is coupled to the anode of a Zener diode 440, the cathode of which is grounded.

The collector of transistor 432 is coupled through a resistor 442 to the base of a regulating predriver transistor 444. The collector of transistor 444 is coupled through two resistors 446, 448 to the collector of transistor 432. The cathode of a Zener diode 450 is coupled to the junction of resistors 446, 448. The anode of the Zener diode 450 is grounded. The cathode of Zener diode 450 is coupled through a resistor 452 to the regulating voltage supply bus 346.

The emitter of regulator predriver transistor 444 is coupled to the base of a regulator driver transistor 454. The collector of transistor 454 is coupled to direct current voltage supply terminal 119 of FIG. 2. The emitter of transistor 454 is coupled to the bases of three parallel coupled regulator output transistors 456, 458, 460. The collectors of transistors 456-460 are coupled to voltage supply terminal 119. Their emitters are coupled through series resistors 462, 464, 466, respectively, to supply bus 346.

The DC component of the high voltage related signal on terminal 398 is supplied to pin 14 of amplifier 422. Amplifier 422 and transistors 432, 444 and 454 amplify this high voltage DC-related signal and control transistors 456-460 therewith to regulate the magnitude of the direct-current voltage on supply bus 346. This voltage, which is fed to the center tap terminal 376 of high voltage transformer primary winding 26, is the voltage which is switched across primary winding 26 and stepped up in secondary winding 28. The voltage generated across secondary winding 28 is thereby linearly controlled by the regulator. Indicator circuits 468, 470, which include transistor-controlled LEDs similar to those hereinbefore described, provide visual indications of signal flow through Butterworth filter 400 and regulator predriver transistor 444, respectively.

The regulator circuit illustrated in FIG. 4*a* further includes a high voltage adjust circuit 472 which operates through the high voltage regulator. Circuit 472 includes a Zener diode 474, the cathode of which is grounded and the anode of which is coupled through a series resistor 476 to minus 15 volts. Coupled across Zener diode 474 are a high voltage adjustment potentiometer 478 and a pair of normally open relay contacts 480 in series. The wiper of potentiometer 478 is coupled through a series resistor 482 to the inverting input terminal, pin 6, of an amplifier 484. The noninverting input terminal, pin 5, of amplifier 484 is coupled through a resistor 486 to ground. The output terminal, pin 4, of amplifier 484 is coupled through a feedback resistor 488 to pin 6 thereof. Pin 4 of amplifier 484 is also coupled through two series resistors 490, 492 to ground.

The output terminal, pin 4, of amplifier 484 is further coupled through two series time constant-determining resistors 494, 496 to one terminal of a soft-start capacitor 498, the remaining terminal of which is grounded. A diode 500 is coupled in parallel relationship to resistor 496 to provide a discharging time constant for capacitor 498 which differs from the charging time constant thereof.

The junction of diode 500 and capacitor 498 is coupled to a noninverting input terminal, pin 9, of an amplifier 502. The inverting input terminal, pin 8, and the output terminal, pin 10, of amplifier 502 are shorted together, making amplifier 502 a noninverting amplifier. Pin 10 of amplifier 502 is also coupled through a series resistor 504 to the inverting input terminal, pin 1, of an amplifier 506. The noninverting input terminal, pin 2, of amplifier 506 is coupled through a series resistor 508 to the junction of resistors 490, 492. A feedback resistor 510 is coupled between the output terminal, pin 3, of amplifier 506 and pin 1 thereof. Pin 3 of amplifier 506 is further coupled to the anode of a diode 512, the cathode of which forms a terminal 514. An indicator circuit 516 including a transistor-controlled LED similar to the indicator circuits previously described, provides a visual indication of signal at terminal 514. Pin 10 of amplifier 502 is also coupled to the inverting input terminal, pin 14, of amplifier 422 through parallel resistors 518, 520.

Much of the circuitry including amplifiers 484, 502, and 506 and their associated circuitry will be discussed hereinafter in connection with the control circuit 40 (FIGS. 1 and 5). For present purposes, however, it will be appreciated that high voltage adjust potential from potentiometer 478 will be supplied through amplifiers 484, 502 to the inverting input terminal, pin 14, of amplifier 422. It should be understood that these signals linearly control regulator output transistors 456–460 in a manner similar to that in which actual high voltage related signals at terminal 398 of Butterworth filter 400 control transistors 456–460.

Referring now to FIG. 4*b*, high voltage rectifier and multiplier 30 will be discussed. In the illustrated embodiment, the high voltage is a high-magnitude negative voltage, e.g., minus 140 KV DC. To generate this high voltage, the voltage variations induced in high voltage transformer 24 secondary winding 28 are rectified and multiplied, illustratively by a factor of six, in circuit 30. Twelve high voltage rectifying diodes 522–544 are coupled in series between terminal 546 of secondary winding 28 and the negative high voltage terminal 548. Six pairs of series-coupled storage capacitors 550, 552; 554, 556; 558, 560; 562, 564; 566, 568; and 570, 572 are coupled, respectively, between the anode of diode 522 and the anode of diode 530; the cathode of diode 524 and the cathode of diode 532; the anode of diode 530 and the anode of diode 538; the cathode of diode 532 and the cathode of diode 540; the anode of diode 538 and the anode of a Zener diode 580, the cathode of which is coupled to terminal 546; and the cathode of diode 540 and the other terminal 582 of secondary winding 28.

A large-value series resistor 584 is coupled between negative high voltage terminal 548 and output terminal 32. A series combination of a resistor 586 and the main current conducting terminals 588, 590 of shorting device 36 are coupled between terminal 32 and ground. Terminals 588, 590 are the terminals of a normally closed solenoid-actuated relay. The control solenoid 592 of this relay is serially coupled between terminal 160 of the control panel 20 (FIG. 2) and ground. Also coupled between terminals 160 and ground is a bidirectional Zener diode 598 which protects against excessive voltage across solenoid 592.

High voltage circuit 30 additionally includes some sensing circuits. One terminal of a very large-value resistor 600 is coupled to terminal 548. The remaining terminal of resistor 600 is coupled to the parallel combination of a kilovolt meter 602 and a meter-scale controlling resistor 604. The other terminal of this parallel combination is terminal 398 of active filter 400 of FIG. 4*a*. The parallel combination of a large-value resistor 606 and a capacitor 608 is coupled between terminal 398 and ground. In the circuit including resistors 600, 606, the resistance value of the parallel combination of KV meter 602 and scale resistor 604 is negligible compared to the values of resistors 600 and 606. Thus, resistors 600, 606 constitute an extremely high resistance voltage divider between terminal 548 and ground. As was previously mentioned, a voltage signal directly related to the high voltage at terminal 548 is available at terminal 398.

One terminal of a parallel combination of a microammeter 610 and a scale resistor 612 is coupled to terminal 546 of secondary winding 28. A parallel combination of a capacitor 614 and resistor 616 is coupled between the other terminal 618 of the microammeter-scale resistor circuit and ground. Since the junction of high voltage capacitor 568 and Zener diode 580 is at ground, it can be seen that terminal 618 will be maintained at a slightly positive potential (less than or equal to the reverse breakdown voltage of Zener diode 580). It can also be seen that since the microammeter 610 circuit is coupled between terminal 546 of secondary winding 28 and ground, the current through the circuit will be equal to the current flowing between terminals 32, 34 of high voltage circuit 30. It must be recognized, therefore, that the voltage of terminal 618 will always be directly proportional to the current flowing between terminals 32, 34. The significance of this fact can be appreciated by referring to the following discussion of the predictive control circuit 40.

Referring now to FIG. 5, the partly block and partly schematic diagram of the predictive control circuit 40 of FIG. 1, the signal representative of current flow between high voltage circuit 30 terminals 32, 34 is coupled from terminal 618 to a second three-pole active filter 620. Filter 620 is a Butterworth filter and is similar to filter 400 of FIG. 4a.

Active filter 620 includes three series resistors 622, 624, 626 coupled between terminal 618 and the noninverting input terminal, pin 3, of an amplifier 628. The output terminal, pin 6, of amplifier 628 is coupled through a feedback resistor 630 to the inverting input terminal, pin 2, thereof. Coupled between the junction of resistors 622, 624 and ground are a capacitor 632 and a Zener diode 634, the anode of which is grounded. A capacitor 636 is coupled between pin 3 and ground. A capacitor 638 is coupled between pin 6 and the junction of resistors 624, 626. Pin 2 is coupled to ground through a resistor 640. An indicator circuit 642 including a transistor-controlled LED provides a visual indication of the presence of signal at the output terminal of amplifier 628 of filter 620.

The output terminal, pin 6, of amplifier 628 is coupled through a resistor 644 to the inverting input terminal, pin 6, of an amplifier 646 in fixed difference circuit 44. The noninverting input terminal, pin 5, of amplifier 646 is coupled through a resistor 648 to ground. The output terminal, pin 7, of amplifier 646 is coupled through a feedback resistor 650 to pin 6 thereof.

The output terminal, pin 6, of amplifier 628 is further coupled through two series resistors 652, 654 to a manually switched resistance matrix 655. Matrix 655 includes a set of eight selectively actuable switches 656–670. Eight serially coupled resistors 672–686 are coupled between ground at one terminal of resistor 686 and one terminal of a resistor 688, which is joined to a terminal of resistor 672. The remaining terminal of resistor 688 is grounded. The remaining terminal of switch 656 is coupled to the junction of resistors 672, 688. This junction is also coupled through a resistor 690 to plus 15 volts. The remaining terminal of switch 658 is coupled to the junction of resistors 672, 674. The remaining terminal of switch 660 is coupled to the junction of resistors 674, 676. The remaining terminal of switch 662 is coupled to the junction of resistors 676, 678. The remaining terminal of switch 664 is coupled to the junction of resistors 678, 680. The remaining terminal of switch 666 is coupled to the junction of resistors 680, 682. The remaining terminal of switch 668 is coupled to the junction of resistors 682, 684. The remaining terminal of switch 670 is coupled to the junction of resistors 684 and 686.

The junction of resistors 652, 654 is coupled to the inverting input terminal, pin 2, of a summing amplifier 692. The noninverting input terminal, pin 3, of amplifier 692 is coupled through a resistor 694 to ground. The output terminal, pin 1, of amplifier 692 is coupled through a feedback resistor 696 to pin 2 thereof. The output terminal of amplifier 692 is also coupled to an input terminal, pin 8, of a keyed sampling integrated circuit 700. Voltages are supplied from the plus 15 and minus 15 volt supplies to pins 4, 11, respectively, of keyed sampler 700. Voltage is also supplied from the plus 15 volt supply through a series resistor 702 to pin 14 thereof. This voltage is regulated by a Zener diode 704, which is coupled to pin 14.

Figure 3:
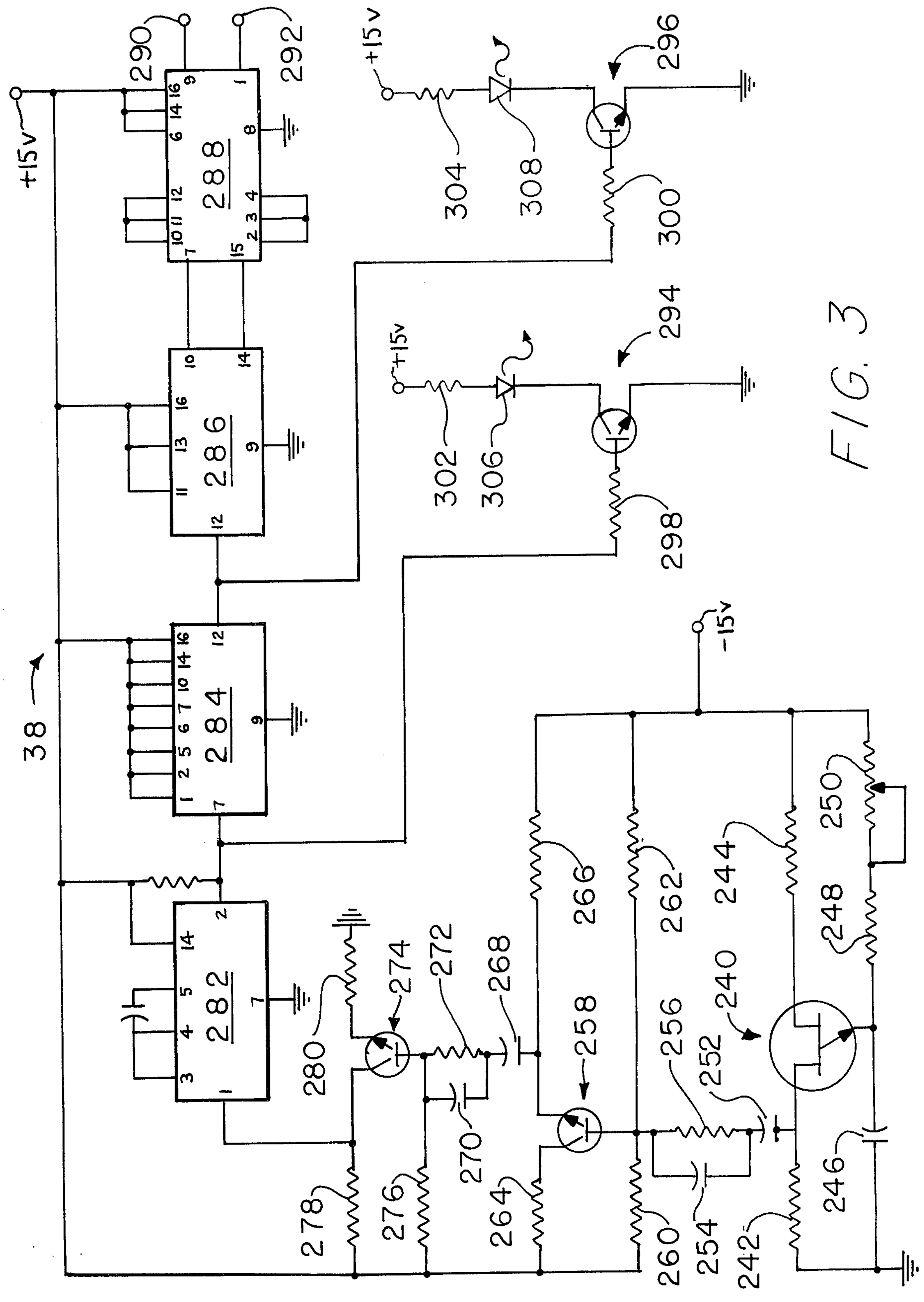
FIG. 3 is a partly block and partly schematic diagram of a detail of the system of FIG. 1.

Sampler 700 is keyed by a signal derived from clock circuit 38. A 5 KHz signal supplied from clock 38 of FIG. 3 is applied to a terminal 706 of a divider 707 in circuit 40. Terminal 706 is coupled to an input terminal, pin 6, of a divide-by-ten integrated circuit 708. The output terminal, pin 12, of circuit 708 is coupled to the input terminal, pin 6, of a divide-by-ten integrated circuit 710. The output terminal, pin 12, of circuit 710 is coupled to the input terminal, pin 6, of a divide-by-ten integrated circuit 712. These three cascaded divide-by-ten circuits 708, 710, 712 reduce the frequency of the 5 KHz pulses coupled to pin 6 of divide-by-ten circuit 708 by a factor of 1000. Thus, there appear at the output terminal, pin 12, of divide-by-ten circuit 712 pulses having a frequency of 5 Hz. The 5 Hz pulses are shaped in a wave-shaping integrated circuit 714 which is coupled to pin 12 of integrated circuit 712. The output terminal, pin 2, of wave-shaping circuit 714 is coupled through a series resistive divider comprising resistors 716, 718 to ground. The junction of resistors 716, 718 is coupled to the keying input terminals 12, 13 of keyed sampler 700.

In its operation, keyed sampler 700 can be thought of as including a switch which closes to connect pins 8, 10 thereof together for a brief sampling interval after each positive-going pulse appears on pins 12, 13 thereof. Closing this switch causes the voltage on pin 8 of sampler 700 to be impressed across a sample-and-hold capacitor 720, which is connected between pin 10 of sampler 700 and ground. After this sample voltage is stored in capacitor 720, the switch opens, holding the stored voltage there until the beginning of the next sampling interval. Since in the illustrated embodiment the sampling rate is 5 Hz, the hold interval is 200 milliseconds.

An indicator circuit 719 is also coupled to the output terminal, pin 2, of wave-shaping circuit 714. Indicator circuit 719 includes a transistor-controlled LED which produces a visual indication of the presence of signal at pin 2 of circuit 714.

The stored voltage across capacitor 720 is supplied to the noninverting input terminal, pin 3, of an amplifier 722. The output terminal, pin 6, of amplifier 722 is coupled to its inverting input terminal, pin 2, making amplifier 722 a noninverting amplifier.

The output terminal, pin 6, of amplifier 722 is coupled through a series resistor 724 to the noninverting input terminal, pin 5, of an amplifier 726. The output terminal, pin 7, of amplifier 726 is coupled through a feedback resistor 728 to pin 6 thereof. The output terminal, pin 7, of amplifier 646 is coupled through a resistor 730 to the inverting input terminal, pin 6, of amplifier 726.

Amplifier 726 is a comparator. Comparator 726 compares a signal related to the actual instantaneous value of the current flowing between terminals 32, 34 of the high voltage circuit 30 (which signal is coupled to the inverting input terminal, pin 6, thereof) and a signal related to the sampled-and-held valve of that current, which value is stored in capacitor 720 during each sampling interval as previously described. This last signal is coupled to pin 5 of comparator 726.

The output signal from filter 620, at pin 6 of amplifier 628, is coupled through a resistor 652 to a summing point at the junction of resistors 652, 654. A reference voltage established between plus 15 volts and ground by manually switched resistance matrix 655 is supplied to the summing point through resistor 654. These two voltages are supplied to the inverting input terminal, pin 2, of summing amplifier 692.

It is important to note that the sum of these two voltages is representative of the actual DC component of current flow between terminals 32, 34 plus some fixed difference voltage established by plus 15 volt reference voltage and resistance matrix 655. Thus, the voltage signal at the output terminal, pin 1, of amplifier 692 is related to the actual DC component of current between terminals 32, 34 plus the fixed difference. This signal is stored in sample-and-hold capacitor 720 during each sampling interval. The stored voltage is held until the next sampling interval begins. The stored voltage is supplied through noninverting amplifier 722 and resistor 724 to the noninverting input terminal, pin 5, of comparator 726.

The output signal from amplifier 628 of filter 620 is also coupled through an inverting amplifier 646 and a resistor 730 to the inverting input terminal, pin 6, of comparator 726. If, during the coating of part 14, the signal related to the actual value of current between terminals 32, 34 as supplied to pin 6 of comparator 726 exceeds the sampled signal, the output terminal, pin 7, of comparator 726, goes to a positive potential. The significance of this positive potential will be discussed subsequently.

Pin 1 of summing amplifier 692 is also coupled to a second manually switched resistance matrix 732 in automatic ranging circuit 46. Matrix 732 includes eight serially coupled resistors 734-748. One terminal of resistor 748 is coupled through a series resistor 750 to ground. As with the previously described resistance matrix, matrix 732 is controlled by eight switches 752-766.

The junction of resistors 734, 736 is coupled to one terminal of switch 752. The junction of resistors 736, 738 is coupled to one terminal of switch 754. The junction of resistors 738, 740 is coupled to one terminal of switch 756. The junction of resistors 740, 742 is coupled to one terminal of switch 758. The junction of resistors 742, 744 is coupled to one terminal of switch 760. The junction of resistors 744, 746 is coupled to one terminal of switch 762. The junction of resistors 746, 748 is coupled to one terminal of switch 764. The junction of resistors 748, 750 is coupled to one terminal of a switch 766. The remaining terminals of switches 752-766 are common.

The common terminals of switches 752-766 are all coupled through a series resistor 768 to an inverting input terminal, pin 2, of an amplifier 770. A noninverting input terminal, pin 3, of amplifier 770 is coupled through a series resistor 772 to the output terminal, pin 6, of amplifier 722. The output terminal, pin 1, of amplifier 770 is coupled through a feedback resistor 774 to its inverting input terminal, pin 2. Amplifier 770 serves as a comparator. Comparator 770 compares the same signal, related to the sampled value of current between terminals 32, 34 of high voltage circuit 30, as does comparator 726, to a signal related to the actual value of current flowing between terminals 32, 34.

The output terminal of comparator 726 is coupled through a series diode 776 and resistor 778 to a control bus 779. The output terminal, pin 1, of comparator 770 is coupled through a series diode 782 and resistor 784 to control bus 779.

A bidirectional Zener diode 786 is coupled between control bus 779 and ground. The collector of a control transistor 788 is also coupled to control bus 779. The emitter of transistor 788 is coupled to ground. The base of transistor 788 is coupled through a series resistor 790 to terminal 514 of the switching and regulation circuit (FIG. 4*a*). Thus, the voltage on terminal 514 controls the voltage on the control bus 779. The reason for this will be explained subsequently.

The gate electrode of a SCR 792 is coupled to control bus 779 through a diode 793 and resistor 794 in series. The gate of SCR 792 is also coupled to ground through a wave-shaping circuit comprising a parallel combination of a resistor 795 and a capacitor 796. A bidirectional Zener diode 797 is coupled in parallel with the wave-shaping circuit to protect the SCR 792 gate. The cathode of SCR 792 is grounded. The anode of SCR 792 is coupled to terminal 157 of solenoid 154 in the panel 20. See FIG. 2.

The gate of SCR 798 is also coupled to control bus 779. A parallel capacitor 799 and resistor 800 are coupled between the gate of SCR 798 and ground. The cathode of SCR 798 is grounded. The anode of SCR 798 is coupled to the base of a transistor 802. The base of transistor 802 is coupled through a series resistor 804 to its collector. The collector of transistor 802 is coupled to terminal 137 of the control panel. The emitter of transistor 802 is coupled to the anode of a diode 803, the cathode of which is coupled through a series resistor 804 and LED 806 to ground.

The cathode of diode 803 is also coupled to one terminal of the parallel combination of a bidirectional Zener diode 808 and a high-speed relay solenoid 810. The other terminal of this parallel combination 808, 810 is grounded. Thus, and importantly, as will be explained subsequently, the voltage on control bus 779 also controls the conduction of SCR 798, which in turn controls the conduction of transistor 802 and current flow through solenoid 810. LED 806 provides a visual indication of energization of solenoid 810.

Predictive control circuit 40 also includes static overload current protection circuit 42. Circuit 42 includes a comparator amplifier 812. The noninverting input terminal, pin 3, of amplifier 812 is coupled through a resistor 814 to the wiper of a potentiometer 816. The other terminals of potentiometer 816 are coupled to ground and to the cathode of a Zener diode 818, respectively. The anode of Zener diode 818 is grounded. The cathode of Zener diode 818 is also coupled through a series resistor 820 to the plus 15 volt supply.

The inverting input terminal, pin 2, of amplifier 812 is coupled through a resistor 822 to the output terminal, pin 6, of amplifier 628 in active filter 620. A feedback resistor 824 is coupled between the output terminal, pin 1, of amplifier 812 and the inverting input terminal thereof. The output terminal of amplifier 812 is also coupled through a diode 826, a resistor 828 and a bidirectional Zener diode 830 to ground. The junction of resistor 828 and Zener diode 830 is coupled through a card interlock resistor 832 to the base of a main relay switching transistor 834. The base of transistor 834 is coupled to ground through a resistor 835. The emitter of transistor 834 is grounded. The collector of transistor 834 is coupled to terminal 151 of the control panel. See FIG. 2.

The output terminal of amplifier 812 is also coupled through a resistor 836 to the inverting input terminal, pin 6, of an amplifier 838. The noninverting input terminal, pin 5, of amplifier 838 is coupled through a resistor 840 to ground. The output terminal, pin 7, of amplifier 838 is coupled through a feedback resistor 842 to the inverting input terminal thereof. The output terminal of amplifier 838 is coupled through a diode 844 to the junction of diode 793 and resistor 794 in the gate circuit of SCR 792.

Proceeding now to an explanation of the operation of the apparatus of system 10, reference will be made first to FIG. 2. When terminals 100, 102 are energized with alternating current line voltage, plus and minus 15 volts quickly become available at terminals 208, 214, respectively, of low voltage supply 18. Thus, voltage is available to operate all of the integrated circuits in the system. However, it takes a somewhat longer time for operating voltage to be supplied across terminals 119, 120 of main voltage supply circuit 16. Thus, all of the control circuits, etc., in the system will be in operation well before the full operating potential of minus 140 KV DC appears across terminals 32, 34. Since switching and regulation circuit 22 and control circuit 40 include means responsive to the voltage across terminals 32, 34 and the current therebetween, it will be appreciated that a start-up delay circuit is useful to prevent spurious triggering of the shorting device 36 by such circuits until operating potential is reached across terminals 119, 120 and 32, 34.

This start-up delay function is incorporated into the high voltage switching and regulation circuit 22 of FIG. 4a. Referring specifically to high voltage adjust potentiometer 478 and its associated circuit components, normally open relay contacts 480 will supply control potential from the minus 15 volt supply to potentiometer 478 only after solenoid 150 of panel 20 has been energized. See FIG. 2. This will occur only after push-to-close high voltage "on" switch 134 is manually closed. Typically, the operator of system 10 will delay closing switch 134 until he is certain that full operating potential is available across main power supply 16 terminals 119, 120. When contacts 480 are closed, i.e., when solenoid 150 of FIG. 2 is energized, pin 4 of amplifier 484 will be at a positive potential. This positive potential will charge start-up capacitor 498 through resistors 494, 496. Positive potential will also appear across voltage divider 490, 492 and at the noninverting input terminal, pin 2, of amplifier 506. The start-up potential across capacitor 498 is supplied through amplifier 502 to pin 1 of amplifier 506. Until the signal on pin 1 of amplifier 506 exceeds the potential at pin 2 of amplifier 506, the output terminal, pin 3, of amplifier 506 will remain positive. Indicator circuit 516 will produce a visual display of this condition. More importantly, however, terminal 514, which is coupled to the base of control transistor 788 of FIG. 5, will remain positive. Thus, transistor 788 will remain conductive and control bus 779 of FIG. 5 will remain at approximately ground potential. After start-up capacitor 498 has charged sufficiently, pin 3 of amplifier 506 will go to low potential. Transistor 788 of FIG. 5 will become nonconductive and control bus 779 will assume whatever potential is impressed upon it by control circuit 40. See FIG. 5.

After start-up the high-voltage "on" switch 134 is depressed. Current flows through switches 132, 134, 138, the equipment coupled between terminals 140, 142 and 144, 146, respectively, and solenoid 150. Contacts 480 of FIG. 4*a* are thus closed, and high voltage adjust potential appears at pin 6 of amplifier 484.

Referring now to static overload protection circuit 42 in FIG. 5, control potential is supplied through potentiometer 816 as plus 15 volt potential becomes available. Since there is no current flow between terminals 32, 34 immediately after system 10 is energized, there is no output signal on pin 6 of amplifier 628 in the current filter 620. Pin 1 of amplifier 812 is positive. This positive potential is coupled to the base transistor 834, driving that transistor into saturation and allowing current to flow from terminal 151 of the panel (see FIG. 2) to ground. Thus, as soon as switch 134 of the panel is depressed, solenoid 149 on the panel is actuated. Current flow through solenoid 149 causes terminals 136 and 164 on the panel and 380 in the switching and regulation circuit 22 (FIG. 4*a*) to close. As terminals 380 close, high voltage begins to be supplied across terminals 32, 34 of circuit 30.

Application of potential at terminal 137 of panel 20 causes transistor 802 of FIG. 5 to be turned on. Conduction by transistor 802 energizes high-speed relay solenoid 810, closing contacts 168 of panel 20 to allow current to flow through the actuating coil 592 of shorting device 36 of FIG. 4*b*. The normally closed contacts 588, 590 thereof thus open and will remain open until current flow through coil 592 is interrupted.

The system 10 is now ready to supply potential for coating. As articles 14 begin to pass by head 12, current flow between terminals 32, 34 as charged particles of coating material are deposited from head 12 upon articles 14. As was previously mentioned, voltage signals related to such current flow appear as terminal 618 of FIGS. 4*b* and 5. These signals are at all times directly related to the actual current flowing between terminals 32, 34.

Referring now to FIG. 5, substantially the DC component only of the signals appears at pin 6 of amplifier 628 in filter 620. Such signals are continuously compared in amplifier 812 to the static overload current setting of potentiometer 816. Should the actual DC component of current between terminals 32, 34 exceed such static overload setting, pin 1 of amplifier 812 will be reduced to a low potential. Transistor 834 is turned off and solenoid 149 of panel 20 is de-energized. Contacts 136, 164 on panel 20 open, as do contacts 380 in the switching and regulation circuit 22. A high potential appears at the output terminal, pin 7, of amplifier 838. This high potential causes current flow in the gate of SCR 792, turning SCR 792 on and reducing its anode to approximately ground potential. Current flows in solenoid 154 and lamp 156 of panel 20. Current flow through solenoid 154 causes normally open contacts 158 to close, latching solenoid 154 on. Lamp 156 produces a visual indication that a current overload has occurred. Energization of solenoid 154 also causes normally closed contacts 174 in the panel to open. Opening of contacts 174 interrupts current flow in actuating coil 592 of shorting device 36. Contacts 588, 590 of shorting device 36 close, shorting out the high voltage supply.

Assuming now that normal operating conditions have been restored in system 10, fixed difference circuit 44 will be explained. Signals representative of the DC component of current flow between terminals 32, 34 are coupled through inverting amplifier 646 to the inverting terminal, pin 6, of comparator 726. Further, such signals plus a fixed difference signal from matrix 655 are summed in amplifier 692 and supplied to sample-and-hold integrated circuit 700. Every 200 milliseconds the signal on pin 1 of amplifier 692 is sampled.

Unless the current between terminals 32, 34 exceeds the sampling interval current plus this fixed difference current, the input signal at pin 5 of comparator 726 is greater than the signal at pin 6 thereof and the output terminal, pin 7, of comparator 726 remains at a low potential. However, if the actual current between terminals 32, 34 during the hold interval exceeds this fixed difference, the potential at pin 7 of amplifier 726 and thus on control bus 779 increases. Such increase causes current to flow in the gates of SCRs 792 and 798, turning them on. Transistor 802 is turned off, de-energizing solenoid 810 and opening contacts 168 on panel 20. Current flow through operating coil 592 of shorting device 36 (FIG. 4*b*) is interrupted, shorting terminals 32, 34. Conduction by SCR 792 energizes solenoid 154 on the panel, closing contacts 158 and latching solenoid 154 on. Lamp 156 produces a visual indication of disruption of the voltage across terminals 32, 34.

Turning now to automatic ranging circuit 46 and assuming normal operating conditions in system 10, the signal representative of the instantaneous current between terminals 32, 34 plus a fixed difference is coupled from pin 1 of summing amplifier 692 to manually switched resistance matrix 732. Resistance matrix 732 comprises an attenuating resistive voltage divider on the inverting input terminal, pin 2, of comparator 770. The noninverting input terminal, pin 3, of comparator 770 receives the sample-and-held signal related to current between terminals 32, 34 plus fixed difference, just as does the noninverting input terminal, pin 5, of comparator 726. Comparator 770 thus compares the sampled-and-held signal related to current between terminals 32, 34 with an attenuated signal related to the instantaneous current between terminals 32, 34. If the instantaneous current, as attenuated by resistance matrix 732, at any time exceeds the signal related to the sampled-and-held current, the output terminal, pin 1, of comparator 770 goes to positive potential. This positive potential appears on control bus 779.

It is important to note that comparator 770 compares a signal related to the sampled-and-held current between terminals 32, 34 to a signal related to the instantaneous actual current between terminals 32, 34. Thus, comparator 770 is not concerned with the absolute magnitude of the current between terminals 32, 34 in the manner that fixed difference comparator 726 is. Rather comparator 770 is concerned only with the difference between instantaneous value and sampled-and-held value of such current. It can be appreciated that comparator 770 and its associated components in circuit 46 are automatic ranging.

It should be recognized that in the present embodiment the automatic ranging circuit 46, by utilizing the same sampled-and-held signal as does the fixed difference circuit 44, does not require a sample-and-hold circuit of its own. This results in a saving of the circuitry required by the automatic ranging circuit. Automatic ranging circuit 46 could obtain signals directly from active filter 620, sample and hold such signals in its own sample-and-hold circuit similar to circuit 700, and compare such sampled-and-held signals with signals representative of a predetermined fixed multiple of the output signal from filter 620. This predetermined multiple could be set in a manually switched resistance matrix such as matrix 732.

The invention is useful with charging devices other than the atomizing and charging head of the illustrated embodiment. For example, the invention can be used with hand-held electrostatic coating apparatus as well as other types of apparatus for imparting a charge to coating particles such as atomized liquid paint, powdered coating particles, etc.

The following system components are identified with reference to the illustrated embodiment.

| | |
|---|---|
| High Voltage Switch 36 | Kilovac XKC-27 |
| Integrated Circuits | |
| 216 | MC 1468 R |
| 282 | Motorola 667P |
| 284 | Motorola 684P |
| 286 | Teledyne 312 AJ |
| 288 | Teledyne 321 AJ |
| 408, 628 | 741 |
| 422, 484, 502, 506 | 1/4 XR 4136 |
| 708, 710, 712 | Motorola MC 684 |
| 714 | Motorola MC 667 |
| 700 | National AH 0014 CD |
| 722 | 301 |
| 646, 692, 726, 770 | 1/2 458 |
| 812, 838 | |

What is claimed is:

1. A system for controlling voltage across a pair of out-put terminals including a power supply for generating the voltage, means for coupling the supply to the output terminals, means for sensing the output current flowing between the terminals, means for disrupting the impressed voltage, the disrupting means being coupled to the terminals and having at least one control electrode, a control circuit, first circuit means for coupling the control circuit to the sensing means for providing an output current-related signal at a terminal of the control circuit, the control circuit including second circuit means for generating a first input signal related to the output current-related signal by a predetermined selectively variable fixed difference, sample-and-hold circuit means for sampling the first input signal during successive sampling intervals and for storing the value of the first input signal between successive sampling intervals, and a first comparator for comparing the stored value to the current-related signal and for generating a first output signal when the current-related signal exceeds the stored value, and means for coupling the first comparator to the control electrode, the first output signal controlling the disrupting means, the improvement wherein the control circuit further includes third circuit means for generating a second input signal related to the first input signal by a predetermined, selectively variable multiplier, and a second comparator for comparing the stored value to the second input signal when the second input signal exceeds the stored value, and means for coupling the second comparator to the control electrode, the second output signal also controlling the disrupting means.

2. The invention of claim 1 wherein the second circuit means includes a reference voltage source, a summing point and a first, selectively variable resistance for generating a fixed difference signal, the first resistance being coupled to the reference voltage source and to the summing point, the first circuit means being coupled to the summing point, and a summing amplifier, the summing amplifier having an input terminal coupled to the summing point and an output terminal coupled to the sample-and-hold circuit for generating at an input terminal of the sample-and-hold circuit the first input signal.

3. The invention of claim 2 wherein the first resistance is discretely variable.

4. The invention of claim 1 wherein the third circuit means includes a second, selectively variable resistance for adjusting the first input signal by a predetermined amount corresponding to the multiplier.

5. The invention of claim 4 wherein the second resistance is discretely variable.

6. The invention of claim 1 wherein the sensing means comprises resistive circuit means coupled to the pair of output terminals.

7. The invention of claim 1 wherein the control circuit further comprises selectively variable static overload current-adjust means for limiting the maximum allowable current flow between the output terminals.

8. The invention of claim 7 wherein the selectively variable current-adjust means comprises a comparator having first and second input terminals and an output terminal, the first input terminal of the current-adjust comparator being coupled to the first circuit means, means for generating a selectively variable signal related to the maximum allowable current flow between the first and second terminals, means for coupling the selectively variable signal generating means to the second input terminal of the current-adjust comparator, and means for coupling the current-adjust comparator output terminal to the control electrode, the signal on the current-adjust comparator output terminal also controlling the disrupting means.

9. The invention of claim 1 wherein the first circuit means comprises a filter for removing alternating current components above a predetermined frequency from the output current-related signal.

10. The invention of claim 9 wherein the first circuit means comprises a multiple-pole active filter.

11. The invention of claim 10 wherein the filter is a three-pole filter.

12. The invention of claim 9 wherein the predetermined frequency is approximately 100 Hz.

13. A system for electrostatic deposition of a coating on an article, the article being movable relative to a charging device, the system comprising a power supply for generating direct current at high voltage, first and second terminals for having the high voltage impressed thereacross, means for coupling the first and second terminals to the supply, means for coupling the article to one of the terminals, means for sensing the output current flowing between the terminals, and means for disrupting the impressed high voltage, the disrupting means being coupled to the first and second terminals and having at least one control electrode, a predictive control circuit for controlling the disrupting means, first circuit means for coupling the control circuit to the sensing means for providing an output current-related signal at a terminal of the control circuit, the control circuit including second circuit means for generating a fixed difference signal, summing means for adding the fixed difference signal to the current-related signal and for producing a sum signal, the summing means being coupled to the first and second circuit means, third circuit means for sampling the sum signal during successive sampling intervals and for storing the value of the sum signal between such intervals, first means for comparing the stored signal to the current-related signal and for generating an output signal at an output terminal thereof when the current-related signal exceeds the stored value, means for coupling the output terminal of the first comparing means to the control electrode, the output signal controlling the disrupting means, fourth circuit means for generating a second input signal related to the sum signal by a predetermined, selectively variable multiplier, a second comparator for comparing the stored value to the second input signal and for generating a second output signal when the second input signal exceeds the stored value, and means for coupling the second comparator to the control electrode, the second output signal controlling the disrupting means.

14. The invention of claim 13 wherein the first circuit means comprises a filter for removing substantially all alternating current components above a predetermined frequency from the output current-related signal.

15. The invention of claim 14 wherein the filter is a multiple-pole active filter.

16. The invention of claim 13 wherein the control circuit further includes selectively variable current-adjust means for setting the maximum allowable current flow between the first and second terminals.

17. The invention of claim 16 wherein the selectively variable current-adjust means comprises a comparator having first and second input terminals and an output terminal, the first input terminal of the current-adjust comparator being coupled to the first circuit means, means for generating a selectively variable signal related to the maximum allowable current flow between the first and second terminals, means for coupling the selectively variable signal generating means to the second input terminal of the current-adjust comparator, and means for coupling the current-adjust comparator output terminal to the control electrode, the signal on the current-adjust comparator output terminal controlling the disrupting means.

18. A regulating system comprising a supply for generating direct current high voltage, the supply including a high voltage transformer having primary and secondary windings and means for rectifying voltage variations appearing across the secondary winding, first and second terminals for having the high voltage impressed thereacross, the first and second terminals being coupled to the supply, means for sensing the voltage impressed across the terminals, the primary winding including at least one terminal for supplying relatively lower voltage to the primary winding and at least one terminal for controlling current flow through the primary winding from the lower voltage supply terminal, means for switching current flow through the primary winding, the switching means being coupled to the control terminal, means for supplying the relatively lower voltage, means for regulating the supply of relatively lower voltage to the primary winding, the regulating means being coupled between the relatively lower voltage supply and the supply terminal of the primary winding, and means for coupling the regulating means to the sensing means, the regulating means being controlled by high voltage representative signals received from the sensing means to control the voltage at the supply terminal of the primary winding.

19. The invention of claim 18 wherein the sensing means comprises a substantially resistive voltage divider coupled between the first and second high voltage terminals.

20. The invention of claim 18 wherein the switching means comprises a clock circuit for generating at least a first output pulse having a predetermined frequency.

21. The invention of claim 20 wherein the frequency is approximately 5 kilohertz.

22. The invention of claim 18 wherein the primary winding comprises two control terminals, one at each end thereof, the supply terminal being provided on the primary winding intermediate the control terminals, the switching means comprising two switching circuits, a clock circuit for generating first and second oppositely phased signals having a predetermined frequency, and means for coupling the clock circuit to the switching circuits.

23. The invention of claim 22 wherein the frequency is approximately 5 kilohertz.

24. The invention of claim 18 wherein the means for coupling the regulating means to the sensing means comprises a filter for removing alternating current voltage components above a predetermined frequency from the high voltage representative signals.

25. The invention of claim 24 wherein the filter comprises a multiple-pole active filter.

26. The invention of claim 24 wherein the predetermined frequency is 100 Hertz.

27. The invention of claim 18 wherein the regulating means linearly regulates the supply of relatively lower voltage to the primary winding supply terminal in substantially inverse linear relation to the sensed high voltage.

28. A circuit for controlling the voltage across a pair of terminals comprising means for switching to reduce the voltage across the pair of terminals, the switching means being coupled to the pair of terminals and including at least one electrode for controlling switching thereof, means for sensing output current flowing between the terminals and for generating signals representative of such output current, the sensing means being coupled to the terminals, means for controlling the switching means, and means for coupling the sensing means to the control means, the control means including means for sampling signals representative of output current during successive sampling intervals and for storing such signals between successive sampling intervals, means for generating a fixed difference signal for combination with the signals representative of output current, means for scaling signals representative of output current by a preselected, fixed multiplier, a first comparator for comparing stored signals related to the sum of the output current-related signals plus the fixed difference signal with signals related to the instantaneous output current and for generating a first control signal when the instantaneous signal exceeds the sum signal, a second comparator for comparing stored signals related to the output current with the scaled output current-related signals and for generating a second output signal when the scaled signals exceed the stored signals and means for coupling the first and second comparators to the control electrode, the first and second output signals controlling the switching means.

29. The circuit of claim 28 and further comprising means for generating a peak output current-related signal and a third comparator for comparing the peak output current-related signal with a signal related to instantaneous output current, and for generating a third output signal when the instantaneous output current-related signal exceeds the peak current signal, and means for coupling the third comparator to the control electrode, the third output signal controlling the switching device.

30. The circuit of claim 28 wherein the means for coupling the sensing means to the control means comprises a filter for filtering the output current-related signal supplied by the sensing means to provide an output current-related signal from which alternating current components of the output current above a predetermined frequency have been substantially removed.

* * * * *